UNITED STATES PATENT OFFICE.

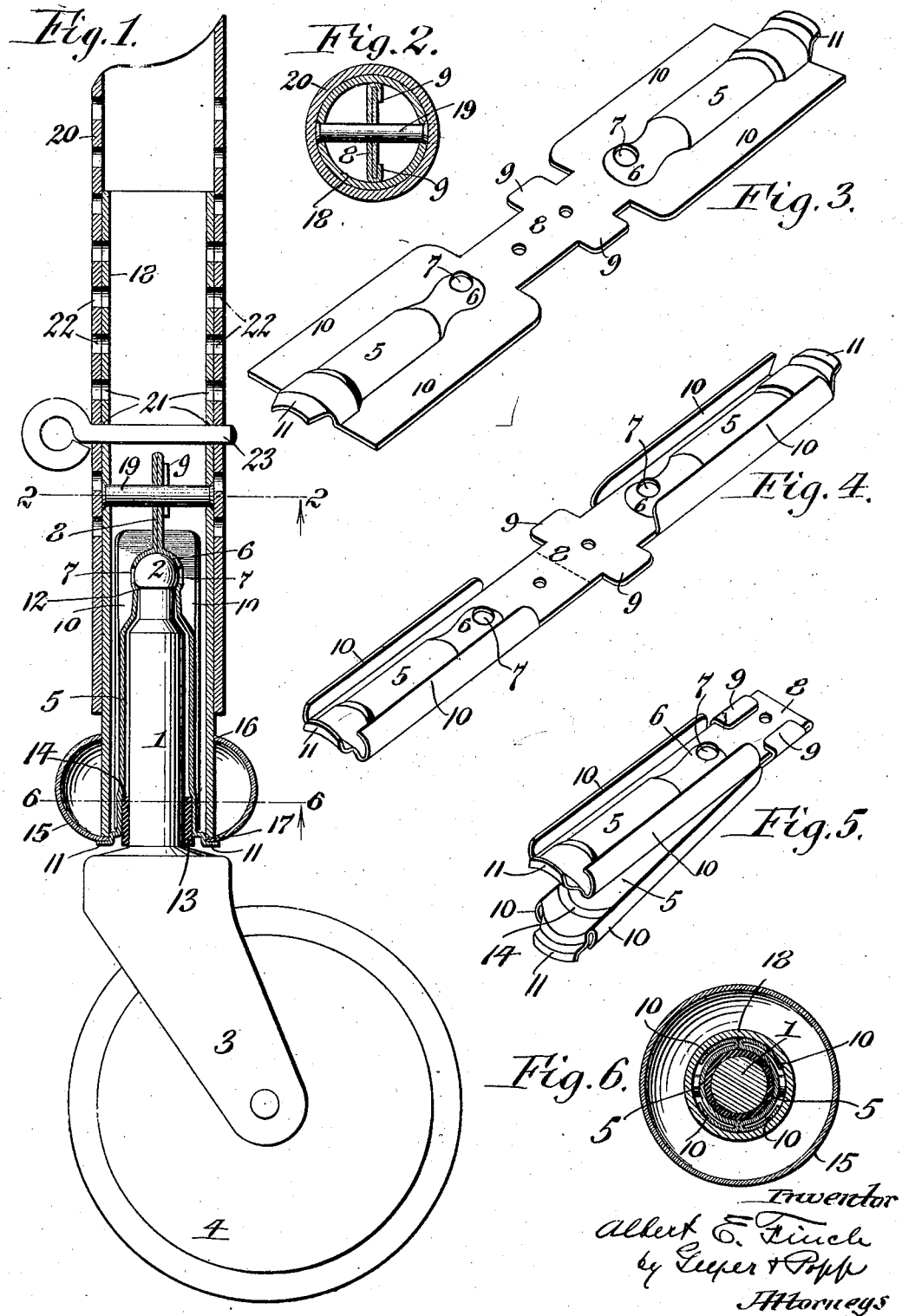

ALBERT E. FINCH, OF BUFFALO, NEW YORK, ASSIGNOR TO BELT GRIP PULLEY COMPANY, OF BUFFALO, NEW YORK, A CORPORATION OF DELAWARE.

CASTER.

1,342,500.

Specification of Letters Patent.

Patented June 8, 1920.

Application filed April 7, 1916, Serial No. 89,610. Renewed March 6, 1919. Serial No. 281,079.

*To all whom it may concern:*

Be it known that I, ALBERT E. FINCH, a citizen of the United States, residing at Buffalo, in the county of Erie and State of New York, have invented new and useful Improvements in Casters, of which the following is a specification.

This invention relates to a caster which is more particularly designed for use on hospital beds although the same may also be used for other beds and other places.

The purpose of this invention is to provide a caster which is strong and durable, which can be constructed principally of sheet metal at comparatively low cost, which is noiseless in operation and ornamental in appearance and which permits of readily adjusting the height of the bed or other furniture to suit different requirements.

In the accompanying drawings: Figure 1 is a vertical section of a caster constructed in accordance with my invention and applied to the tubular leg of a bed or similar piece of furniture. Fig. 2 is a horizontal section taken on line 2—2, Fig. 1. Fig. 3 is a perspective view of a partially formed blank from which the socket of the caster mounting is constructed. Fig. 4 is a similar view showing another step in the formation of this socket from a blank. Fig. 5 is a similar view of the completed socket. Fig. 6 is a horizontal section taken on line 6—6, Fig. 1.

Similar characters of reference indicate corresponding parts throughout the several views.

In its general organization this caster comprises a wheeled carriage which is adapted to receive the load and a mounting in which the carriage is pivotally supported and which is attached to the bed or other furniture intended to receive the caster.

The carriage comprises an upright pintle which has a cylindrical lower part or body 1 and a reduced upper end which is preferably constructed in the form of a spherical bearing head 2, a yoke 3 projecting downwardly from the lower end of the pintle and preferably constructed in the form of a fork like the casters now in common use, and a wheel or roller 4 pivoted on the lower end of the yoke.

The caster mounting is preferably constructed of a plurality of parts including a socket which has a lower enlarged tubular part 5 which receives the enlarged body portion of the pintle and an upper reduced part 6 which forms a spherical bearing seat for receiving the upper spherical head of the pintle. This socket is preferably constructed from a single sheet of metal, which is folded to form two sections. Each of these sections is constructed to produce one-half of the enlarged lower cylindrical part of the socket and one-half of the upper spherical part of the same so that when the two sections are folded together the concave sides of the two socket sections face each other and together produce the complete socket. To facilitate the formation of the spherical seat portions of the socket the metal in line with diametrically opposite sides of this seat is first perforated, as shown at 7, so as to permit of stretching the same and rendering it possible to easily shape the same to fit the spherical head of the pintle. These holes also permit of readily lubricating the joint between the spherical head and seat when required.

The upper connected ends of the two sections or parts of the socket are preferably pressed flatwise against each other so as to form an upright transverse web 8 which is composed of two plies of metal, as clearly shown in Figs. 1 and 2 and these two plies are preferably held together by means of two retaining lips 9, 9 formed integrally at opposite vertical longitudinal edges of one of the plies of the web and bent inwardly around the corresponding vertical edges of the other ply of this web, as shown in Figs. 1, 2 and 5.

At opposite longitudinal edges of the socket sections the same are provided with reversely bent bearing flanges 10, 10 which are preferably curved in cross section, and at the lower ends of the socket sections the same are provided with laterally projecting supporting or bearing lugs 11, 11. The two sections of the socket including the retaining lips, bearing flanges and supporting lugs are all preferably constructed from a single sheet of metal, thereby simplifying the construction, reducing the cost of manufacture and also avoiding loosening up or accidental detachment of the parts which go to make up the socket.

Preparatory to introducing the pintle into the socket the sections of the latter are spread apart at their lower ends sufficiently to permit the spherical head of the pintle to enter the spherical seat of the socket, after which the two sections of the socket are pressed together for the purpose of confining the spherical head in its seat and preventing the same from dropping out. This is due to the fact that the diameter of the spherical bearing head is larger than the reduced neck 12 of the socket between the spherical seat and the enlarged lower part of the socket, as shown in Fig. 1.

For the purpose of centering and journaling the lower part of the pintle in the lower end of the socket a tubular bushing 13 is interposed between the lower end of the pintle and the lower end of the socket, this bushing being preferably constructed of fiber or similar material so as to form a bearing for this part of the pintle which is durable and still noiseless in operation without requiring frequent oiling. This bushing preferably rests at its lower end on top of the yoke of the carriage while its upper end engages with an internal downwardly facing shoulder 14 in the bore of the socket, as shown in Fig. 1, thereby holding this bushing against vertical displacement. When thus assembled the pintle of the carriage is free to turn easily in the socket but is prevented from dropping out of the socket while the caster is being used.

15 represents a ferrule preferably constructed in the form of a hollow sphere and provided with upper and lower openings 16, 17 so that the same may be slipped downwardly over the socket for the purpose of resting the lower side of this ferrule against the top of the supporting lugs 11, as shown in Fig. 1.

18 represents an upright shank, preferably of tubular form, which is passed with its lower part downwardly around the socket and through the upper opening of the ferrule and rests with its lower end against the inner side of the lower part of the ferrule vertically in line with the supporting lugs 11. By this means the shank rests indirectly on the supporting lugs and holds the ferrule in place without requiring any separate part for this purpose. The ferrule by this means not only produces a neat and finished appearance for the lower part of the socket and shank but the same also forms a guard which prevents any article, such as clothing or bedding, from being caught on the supporting lugs of the socket. These parts are held in this assembled position by means of a fastening pin 19 passing transversely through corresponding openings in the upper web of the socket and the adjacent parts of the tubular shank, the opposite ends of this pin being preferably upset or riveted so as to permanently connect these parts, as shown in Figs. 1 and 2.

This caster may be mounted on furniture in any suitable manner, for instance, as shown in Figs. 1, 2 and 6 the same is mounted on the lower end of a tubular metal leg 20 which may form the leg of a bedstead. In this case the upper end of the caster shank is inserted into this leg from the lower end thereof and this shank and leg are made adjustable one relatively to the other for the purpose of enabling the height of the bed to be regulated in accordance with different requirements. This adjustment may be accomplished in various ways but as shown in Fig. 1 this is accomplished by providing the upper part of the caster shank with two vertical rows of openings 21 on diametrically opposite sides and providing the bedstead leg with two corresponding vertical rows of openings 22 on diametrically opposite sides thereof, corresponding pairs of openings being adapted to receive a locking pin 23 passing horizontally and transversely through the same. By means of a plurality of pairs of openings in the shank and leg these two members may be shifted vertically to the desired position and then retained in place relatively to each other by passing the locking pin through corresponding pairs of these openings.

This caster is not only very strong and durable and not liable to get out of order, but the same is also noiseless in operation, it can be readily adjusted to vary the height of the bed as required and the same can be produced at comparatively low cost, so as to permit general use of the same.

I claim as my invention:

1. A caster having a carriage comprising an upright pintle provided at its upper end with a spherical head, a yoke at the lower end of said pintle and a wheel pivoted on said yoke, and a mounting for said carriage comprising a socket having a lower tubular body which receives said pintle and a spherical seat at the upper end of said body which receives said spherical head, said socket being constructed of a single piece of sheet metal which has its opposite parts folded together and constructed to form two opposing half seat and body sections which receive said head and pintle, the upper ends of said sections forming a vertical transverse web of two plies of metal, the lower ends of said sections being provided with laterally projecting lugs, and the longitudinal edges of said socket sections being provided with curved bearing flanges, a tubular bushing interposed between the lower part of said socket and said pintle, a spherical ferrule having upper and lower openings and resting with its underside on said lugs, and a tubular shank surrounding said socket and arranged in said ferrule and engaging its bore with said bearing flanges and its lower end with the lower part of said ferrule.

2. A caster having a carriage comprising an upright pintle provided at its upper end with a spherical head, a yoke at the lower end of said pintle and a wheel pivoted on said yoke, and a mounting for said carriage comprising a socket having a lower tubular body which receives said pintle and a spherical seat at the upper end of said body which receives said spherical head, said socket being constructed of a single piece of sheet metal which has its opposite parts folded together and constructed to form two opposing half seat and body sections which receive said head and pintle, the upper ends of said sections forming a vertical transverse web of two plies of metal, one of said web plies being provided at its opposite vertical edges with lips which are bent around the corresponding edges of the other web ply, the lower ends of said sections being provided with laterally projecting lugs, and the longitudinal edges of said socket sections being provided with curved bearing flanges, a tubular bushing interposed between the lower part of said socket and said pintle, a spherical ferrule having upper and lower openings and resting with its underside on said lugs, and a tubular shank surrounding said socket and arranged in said ferrule and engaging its bore with said bearing flanges, and its lower end with the lower part of said ferrule.

3. A caster having a carriage comprising an upright pintle provided at its upper end with a spherical head, a yoke at the lower end of said pintle and a wheel pivoted on said yoke, and a mounting for said carriage comprising a socket having a lower tubular body which receives said pintle and a spherical seat at the upper end of said body which receives said spherical head, said socket being constructed of a single piece of sheet metal which has its opposite parts folded together and constructed to form two opposing half seat and body sections which receive said head and pintle, the upper ends of said sections forming a vertical transverse web of two plies of metal, the lower ends of said sections being provided with laterally projecting lugs, and the longitudinal edges of said socket sections being provided with curved bearing flanges, a tubular bushing interposed between the lower part of said socket and said pintle, a spherical ferrule having upper and lower openings and resting with its underside on said lugs, a tubular shank surrounding said socket and arranged in said ferrule and engaging its bore with said bearing flanges and its lower end with the lower part of said ferrule and a pin passing transversely through said shank and web.

4. A caster having a carriage comprising an upright pintle, a yoke at the lower end of said pintle and a wheel pivoted on the yoke, and a mounting comprising a socket which receives said pintle and which is constructed of two sections folded together from a single piece of metal each section forming one half of said socket, and a tubular shank inclosing the halves of said socket.

5. A caster having a carriage comprising an upright pintle, a yoke at the lower end of said pintle and a wheel pivoted on the yoke, and a mounting comprising a socket which receives said pintle and which is constructed of two sections folded together from a single piece of metal each section forming one half of said socket and provided at its lower end with a laterally projecting lug, and a tubular shank surrounding said socket sections and supported at its lower end by said lugs.

6. A caster having a carriage comprising an upright pintle, a yoke at the lower end of said pintle, and a wheel pivoted on the yoke, and a mounting comprising a socket which receives said pintle and which is constructed of two sections folded together from a single piece of metal each section forming one half of said socket and provided at its lower end with a laterally projecting lug, a tubular shank surrounding said socket sections and supported at its lower end by said lugs, and a fibrous bushing interposed between the lower ends of said arbor and socket.

7. A caster having a carriage comprising an upright pintle, a yoke at the lower end of said pintle and a wheel pivoted on the yoke, and a mounting comprising a socket which receives said pintle and which is constructed of two sections folded together from a single piece of metal each section forming one-half of said socket and the longitudinal edges of said sections being provided with reversely bent bearing flanges, and a tubular shank surrounding said socket and engaging its bore with said bearing flanges.

8. A caster having a carriage comprising an upright pintle, a yoke at the lower end of said pintle and a wheel pivoted on the yoke, and a mounting comprising a socket which receives said pintle and which is constructed of two sections folded together from a single piece of metal each section forming one half of said socket, a tubular shank inclosing said socket and provided with a longitudinal row of openings, a tubular leg which receives said shank and is provided with a longitudinal row of openings, and a pin passing through one or another pair of corresponding openings in said shank and leg.

ALBERT E. FINCH.